(12) United States Patent
Clark et al.

(10) Patent No.: US 7,814,279 B2
(45) Date of Patent: Oct. 12, 2010

(54) LOW-COST CACHE COHERENCY FOR ACCELERATORS

(75) Inventors: Scott Douglas Clark, Rochester, MN (US); Andrew Henry Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 815 days.

(21) Appl. No.: 11/388,013

(22) Filed: Mar. 23, 2006

(65) Prior Publication Data

US 2007/0226424 A1      Sep. 27, 2007

(51) Int. Cl.
*G06F 13/00*      (2006.01)
*G06F 12/08*      (2006.01)

(52) U.S. Cl. .............................. 711/141; 711/E12.026

(58) Field of Classification Search ................. None
See application file for complete search history.

(56) References Cited

U.S. PATENT DOCUMENTS 6,760,819 B2 * 7/2004 Dhong et al. ............... 711/146
6,779,049 B2 * 8/2004 Altman et al. ............... 710/22
2004/0230750 A1 * 11/2004 Blake et al. ................. 711/146
2006/0179277 A1 * 8/2006 Flachs et al. ................ 712/207

OTHER PUBLICATIONS

O. Takahashi et al., The Circuit Design of the Synergistic Processor Element of a Cell Processor, Nov. 2005, IEEE, p. 111.*

* cited by examiner

*Primary Examiner*—Kevin Verbrugge
*Assistant Examiner*—Eric S Cardwell
(74) *Attorney, Agent, or Firm*—Patterson & Sheridan, LLP

(57) ABSTRACT

Embodiments of the invention provide methods and systems for reducing the consumption of inter-node bandwidth by communications maintaining coherence between accelerators and CPUs. The CPUs and the accelerators may be clustered on separate nodes in a multiprocessing environment. Each node that contains a shared memory device may maintain a directory to track blocks of shared memory that may have been cached at other nodes. Therefore, commands and addresses may be transmitted to processors and accelerators at other nodes only if a memory location has been cached outside of a node. Additionally, because accelerators generally do not access the same data as CPUs, only initial read, write, and synchronization operations may be transmitted to other nodes. Intermediate accesses to data may be performed non-coherently. As a result, the inter-chip bandwidth consumed for maintaining coherence may be reduced.

20 Claims, 7 Drawing Sheets

LOW-COST CACHE COHERENCY FOR ACCELERATORS

BACKGROUND OF THE INVENTION

1. Field of the Invention

The present invention generally relates to multiprocessing. More specifically, the invention relates to reducing consumption of bandwidth by communications maintaining coherence between accelerators and CPUs, which could be on the same chip or different chips.

2. Description of the Related Art

Early computer systems comprised a single central processing unit (CPU), along with the CPU's associated memory, input/output (I/O) devices, and mass storage systems such as disk drives, optical storage, magnetic tape drives, and the like.

However, the increasing demand for processing power beyond the capabilities of a single processor has lead to a number of solutions to relieve the increasing strain from demand on processors. One such solution is to use an accelerator coupled with the CPU. Accelerators are autonomous units that are either programmable or perform a specific function. When a request for the performance of such a function is received by the CPU, the performance of the function may be delegated to the accelerator. While the accelerator processes a task to which it is assigned, the CPU may proceed to another task, thereby reducing the strain on the CPU and improving efficiency.

FIG. 1 illustrates an exemplary CPU 100 coupled with an accelerator 110 over an interconnect bus 120. The CPU 100 may be connected to a memory device 102. Memory device 102, for example, may be a Dynamic Random Access Memory (DRAM) device. Additionally, CPU 100 may also contain local cache memory 101 to facilitate fast accesses to data being processed. Accelerator 110 may be connected to the CPU over interconnect bus 120 to perform a specific function. For example, accelerator 110 may be a graphics accelerator that performs specialized graphical computations and transformations. The accelerator may have its own memory 112 and cache 111.

When a request for processing graphics is received by the CPU 100, accelerator 110 may be delegated the task of processing the graphics data. For example, block 1 contained in memory 102 may contain graphics data that requires processing. When the processing request is sent to the CPU, block 1 may be transferred to cache 111 (or accelerator memory 112) for processing by the accelerator. When the processing of block 1 is completed, it may be written back to memory 102 by the accelerator.

One problem with the prior art is that accelerators and CPUs are connected without memory coherence. Because the processor and the accelerator may share data contained in the memories 102 and 112, there is a need for coordination between the accelerator and the CPU when working on shared data. Coherency is required to ensure that the accelerator and the CPU do not access different data addressed by the same memory location. For example, in FIG. 1, the CPU may receive a request to process block 1 after block 1 has been sent to accelerator 110 for processing. If the new request is not a graphics processing request, the CPU may cache block 1 for processing. If the accelerator completes processing the block before the CPU processes the block, the data cached by the CPU will be outdated. Therefore, the CPU will process incorrect data. Memory coherence requires that the most recently modified copy of the data be available to all processing devices.

One solution to this problem is to implement a snooping protocol to update the obsolete data in caches. Addresses and commands issued to each processor may be transmitted to every other processor and/or accelerator. A bus monitor may be used to monitor address lines for memory accesses. If a cache contains a copy of a memory block being addressed on the bus, the cache may update its copy of the memory block. For example, in FIG. 1, a bus monitor may monitor bus 120. If a write operation by accelerator 110 is detected by cache 101 when it contains a copy of block 1, cache 101 may update its own copy of block 1 so that it contains the most recent and accurate copy of block 1 for processing by the CPU.

In other embodiments, cache 101 may invalidate its copy of block 1 in response to detecting a memory write to block 1 in memory 102. Therefore, when the CPU attempts to access block 1 from cache, a fresh copy of block 1 may be retrieved from memory.

However, in a multiprocessing environment with multiple accelerators, CPUs, and shared memory, enforcing cache coherence means all memory accesses must be propagated to all coherent units. Each coherent unit may then snoop the memory access and respond to the initiator of the access indicating whether they need an update. This sort of communication between devices at each access to shared memory may consume much of the inter-node bandwidth and greatly reduce the efficiency of the system. A node may consist of a group of CPUs or accelerators that share a common physical bus through which the CPUs and accelerators perform coherent memory accesses. Often, but not necessarily, nodes are on different chips.

Therefore what is needed are methods and systems to efficiently maintain cache coherence between multiple CPUs and accelerators.

SUMMARY OF THE INVENTION

Embodiments of the present invention generally provide methods and systems for reducing consumption of inter-chip bandwidth by communications maintaining coherence between accelerators and CPUs.

One embodiment of the invention provides a method for maintaining memory coherence between at least one first node and at least one second node in a multiprocessing system. The first node generally comprises one or more central processing units (CPUs), cache memory associated with each of the one or more CPUs, shared memory, and a directory identifying shared memory locations at other nodes. The second node generally comprises one or more accelerators, cache memory associated with each of the one or more accelerators, and a local store associated with each of the one or more accelerators. The method generally includes coherently transferring a block of the shared memory from the first node to one of the local store or cache memory of an accelerator in the second node, non coherently performing one or more operations on the transferred block in the local store, and coherently writing back the block of memory to the shared memory device after performing the one or more operations.

Another embodiment of the invention provides a method for maintaining memory coherence between at least one first node and a second node in a multiprocessing system. The first node may generally comprise of one or more central processing units (CPUs), cache memory associated with each of the one or more CPUs, shared memory, and a nodal directory identifying shared memory locations that are cached at other nodes. The second node may generally comprise of one or more accelerators, cache memory associated with each of the one or more accelerators, and a local store associated with each of the one or more accelerators. The method may generally comprise receiving a request to access a block of shared memory by one of the one or more central processing units, in response to receiving the request, determining whether the block is cached at another location and whether the block is modified, and transmitting the address of the block to the second node if the block is cached and modified at the second node.

Yet another embodiment provides a system for maintaining memory coherence between at least one first node and at least one second node in a multiprocessing environment. The system comprises at least one first node and at least one second node. The first node generally comprises one or more central processing units (CPUs), cache memory associated with each of the one or more CPUs, shared memory, and a directory identifying shared memory locations at other nodes. The second node generally comprises one or more accelerators, cache memory associated with each of the one or more accelerators, and a local store associated with each of the one or more accelerators. The first node is generally configured to receive a request to access a block of shared memory and in response to receiving the request, determine whether the block is cached within the first node or another node and whether the block is modified. If the access is a read access, the first node is configured to provide the most recently modified block of shared memory, and if the access is a write access, update or invalidate locations where the memory block is cached. The second node is generally configured to coherently issue a request to access the block of shared memory in the first node and if the block is transferred to the local store, non-coherently perform operations on the block.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally relates to reducing the consumption of inter-chip bandwidth by communications maintaining coherence between accelerators and CPUs. The CPUs and the accelerators may be clustered on separate nodes in a multiprocessing environment. Each node that contains a shared memory device may maintain a nodal directory to track blocks of shared memory that may have been cached at other nodes. Therefore, commands and addresses may be transmitted to processors and accelerators at other nodes only if a memory location has been cached outside of a node. Additionally, because accelerators generally do not access the same data as CPUs, only initial read, write, and synchronization operations may be transmitted to other nodes. Intermediate accesses to data may be performed non-coherently. As a result, the inter-chip bandwidth consumed for maintaining coherence may be reduced.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

An Exemplary System

Figure 1:
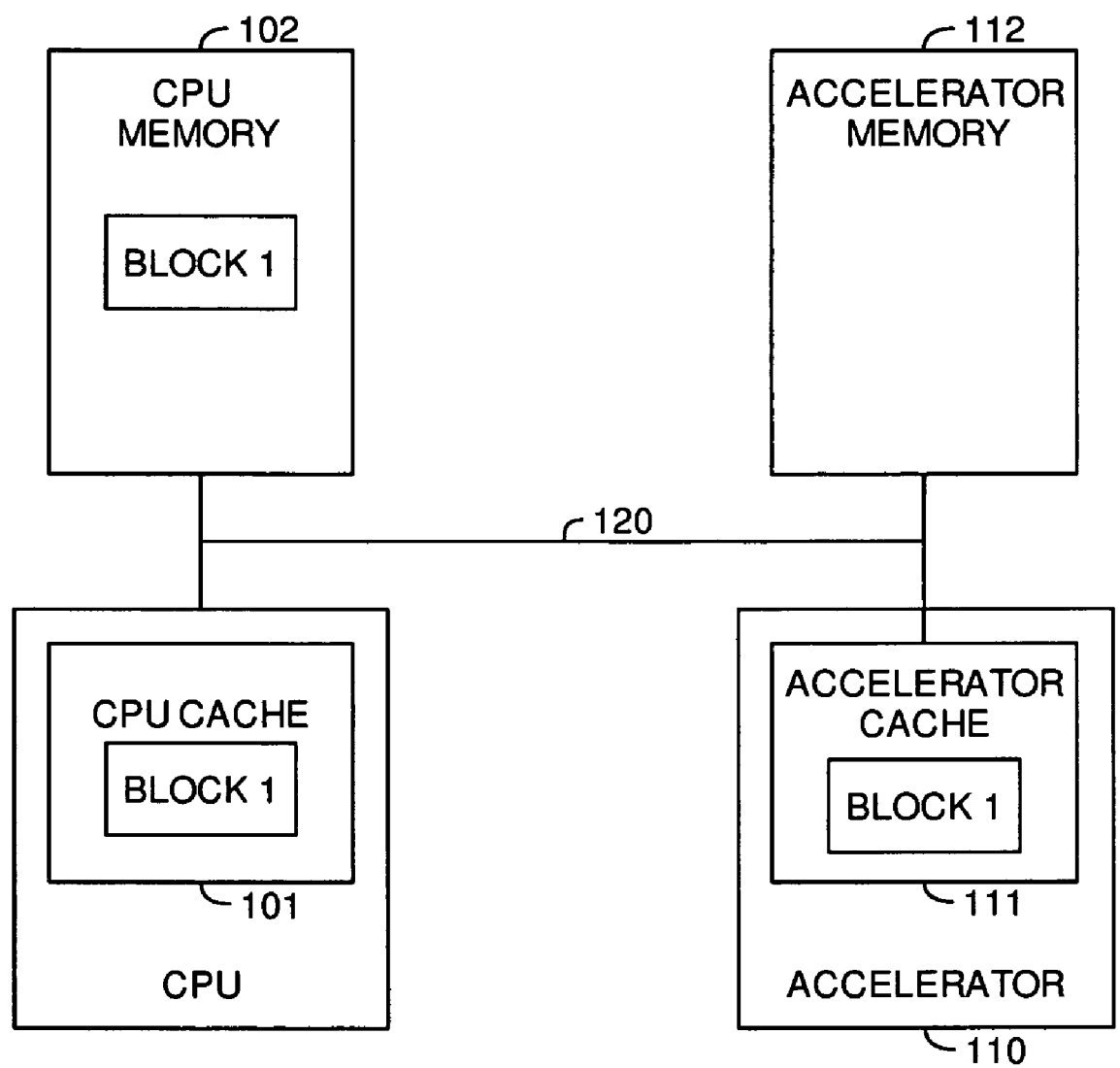
FIG. 1 is a prior art figure illustrating an accelerator coupled with a central processing unit (CPU).
Figure 2A:
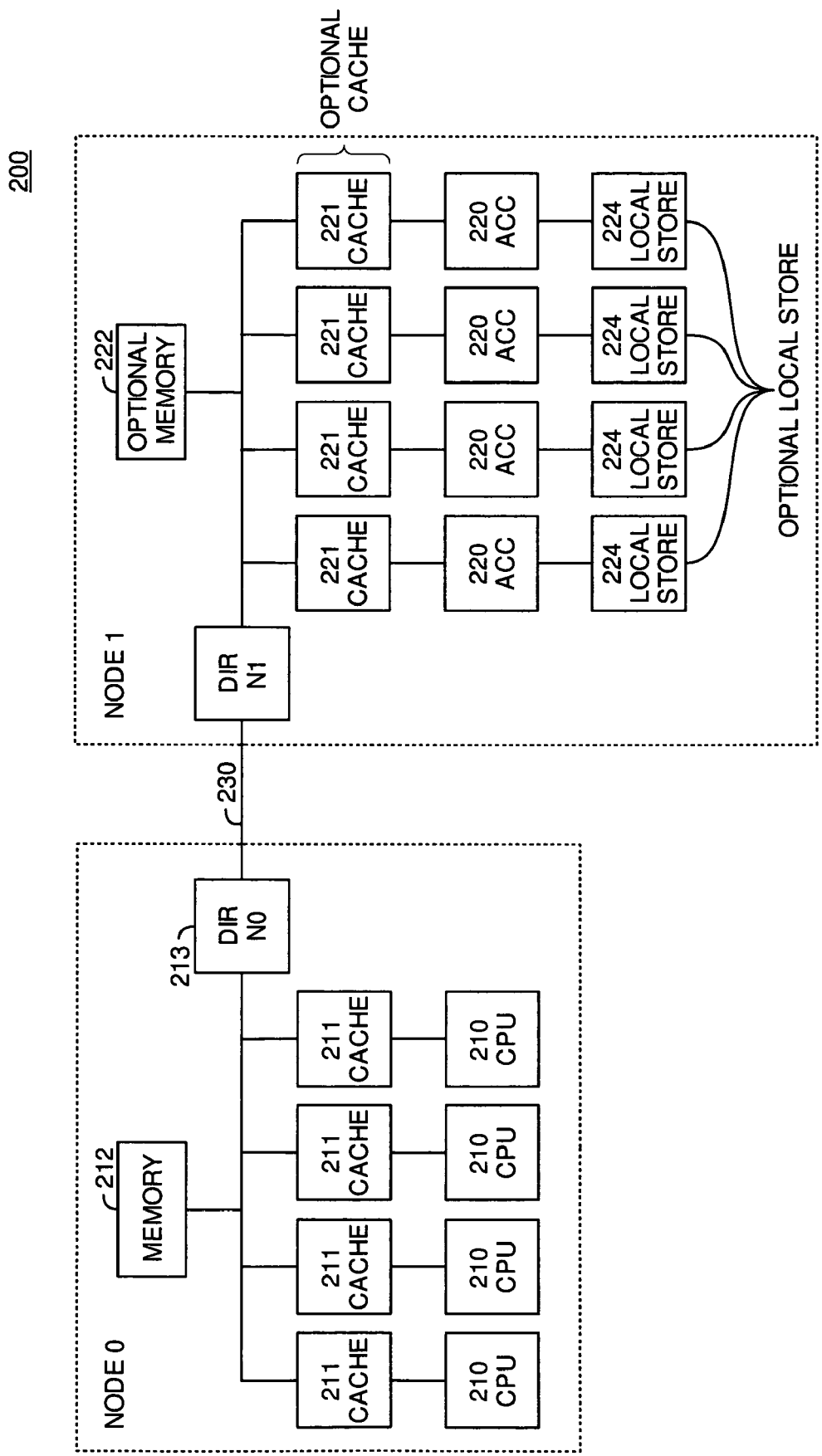
FIG. 2A is an illustration of an exemplary multiprocessing system according to one embodiment of the invention.

FIG. 2A illustrates an exemplary multiprocessing system 200 containing CPUs 210 and accelerators 220 according to one embodiment of the invention. The CPUs 210 and the accelerators 220 of system 200 may be organized into two or more nodes. Each node may contain any combination of processors or accelerators and a shared memory device. The shared memory may be accessible by processors and/or accelerators within the node and by processors and/or accelerators in remote nodes. Memory access time may depend on the location of the memory with respect to a requesting device. Such memory accesses are called Non-Uniform Memory Accesses (NUMA). For example, accesses by a processor to memory within its home node may be faster than accesses to memory at a remote node.

To improve efficiency, processors and shared memory may be selectively clustered at each node to reduce memory access time. For example, processors and accelerators that frequently access data in a given memory device may be clustered together with the memory device in the same node. Furthermore, operating system support may reduce the frequency of accesses between nodes by scheduling processes to run on the same node each time they are run.

Because accelerators only perform specialized tasks upon request by a CPU, the accelerators may be clustered in nodes separate from nodes containing CPUs. Accordingly, in system 200, the CPUs 210 are clustered in node 0 and the accelerators 220 are clustered in node 1. While two nodes are illustrated, one skilled in the art will recognize that any number of nodes may be implemented in the system. Each of the multiple nodes may be interconnected by link 230.

As illustrated, node 0 contains a set of CPUs 210 (four shown in FIG. 2A). Each CPU may have a localized cache memory 211. While private, localized caches are illustrated in the figure, one skilled in the art will recognize that multiple levels of cache memory may also be implemented. Furthermore, one or more levels of cache may be shared amongst the CPUs.

Node 0 may also contain non local memory 212 communicably connected to each CPU. Memory 212 is preferably a random access memory such as a Dynamic Random Access Memory (DRAM). Memory 212 may be sufficiently large to contain data requiring processing by the CPUs. Because accesses to localized cache memory, such as cache memory 211, by the CPUs is faster than accesses to non local memory, such as memory 212, blocks of data being processed by each CPU may be copied from memory 212 to a local cache memory 211 for processing. Memory 212 may also be shared memory that can be accessed by CPUs and/or accelerators at other nodes over link 230.

If memory 212 is shared memory accessible by other nodes, node 0 may also contain a nodal directory 213 to track copies of blocks from memory 212 that are cached at other nodes. The advantage of using a nodal directory 213 is that the system may only inform those processors currently playing an active role in the use of a given address about an operation to that address. For example, the nodal directory may contain information about addresses in the shared memory that are cached at other nodes, the location of those nodes, and the status of that data. Therefore, memory accesses may be transmitted to other nodes only if a particular address is cached at another node and if the data has been modified. Therefore, by using a nodal directory, all addresses and commands need not be transmitted to all nodes, thereby reducing system overhead, latency, and bandwidth consumption across links.

Node 1 may contain one or more accelerators 220. As with the CPUs each accelerator 220 may have associated private cache memory 221. While not illustrated in the figure, one skilled in the art will nevertheless recognize that multiple cache levels may also be implemented. Furthermore, one or more cache levels may be shared between the accelerators in the node. Because accesses within a node may be faster than accesses across link 230 to other nodes, the data to be processed by an accelerator may be copied into a respective cache memory 221 for processing.

Node 1 may contain non local memory 222. Memory 222 may be a shared memory device accessible by the other nodes. As with memory 212, memory 222 may also be a random access memory device such as a DRAM device. If shared memory 222 is included in node 1, a directory 223 may also be included to track copies of blocks from memory 222 that are cached at other nodes.

Each accelerator may also have an associated optional local store 224. Local store 224 may be non coherent memory that is accessed primarily by the accelerator to which it is attached. Because local stores 224 can only be accessed by their respective accelerators, the local stores may be non-coherent. Therefore, transactions between an accelerator and an associated local store need not be propagated to other nodes to ensure coherence or to caches within the same node.

Data processed by the accelerator may be contained in a local store 224. Therefore, accesses by each accelerator to its local store for initial data and intermediate results do not add to the bandwidth requirements of link 230. Final results may be copied by software from local store into memory 212 or 222 before being accessed by CPUs 210. Software may also coordinate and synchronize accelerator and CPU accesses to this type of shared data.

In some embodiments, memory 222, cache 221, and local stores 224 may be optional, and therefore omitted from node 1. Several factors may influence the inclusion of one or more of the above devices. For example, as mentioned above, it may be advantageous to include cache 221 and local stores 224 because memory accesses across nodes may be slower than accesses to local memory. Therefore, the latency and inter-chip bandwidth consumption may be reduced by including caches and local stores. If the accelerators process large amounts of data, it may be advantageous to include memory 222 because accesses to shared memory at other nodes may be slower than accesses to shared memory within a node. As with the caches, including memory may reduce latency and inter-chip bandwidth. Yet another factor may be the size and complexity of the directory that may be required if memory is included. Large memories may require larger and more complex directories, which may become bottlenecks that degrade performance.

Figure 2B:
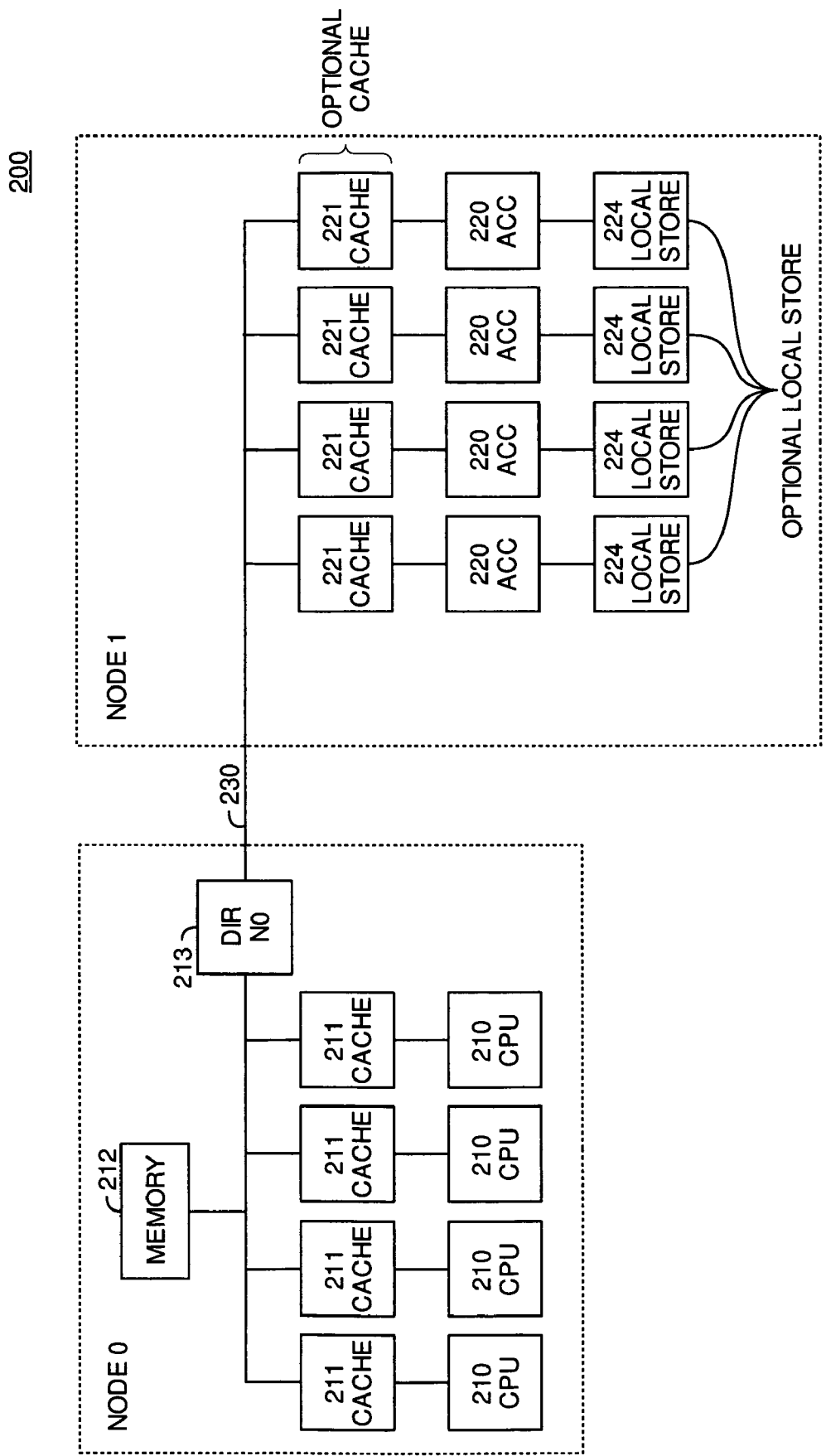
FIG. 2B is another illustration of an exemplary multiprocessing system according to one embodiment of the invention.

FIG. 2B is an alternative embodiment of the invention in which shared memory 222 has been omitted. Accordingly, nodal directory 223 has also been omitted as there are no shared locations to track. In some embodiments, the caches 221 in FIG. 2B may cache only a small amount of data. For example, each cache 221 may only contain 6 cache lines. As a result, nodal directory 213 may track only 24 addresses corresponding to the 6 addresses of each of the 4 caches 221. Therefore, CPU accesses to memory 212 need not be transmitted to node 1 unless an address is cached at one of the 24 locations in node 1, thereby reducing the consumption of bandwidth for maintaining coherence across nodes.

Local cache memories 211 and 221 may be coherent because they may contain copies of data from a shared memory device (such as memory 212 and 222) at another node. Therefore, the modification status of blocks in caches 211 and 221 may be tracked to ensure coherency. For example, if an accelerator writes to a block already in its cache and that block is not modified, the state of all caches in all nodes that contain the block may need to transition. In this case, the address of the block needs to be transmitted to all such caches. The addressed block may transition to an invalid state in other caches and only the accelerator's cache would transition to a modified state. At the same time, if the memory location for the block is in a different node than the accelerator, the nodal directory in that node may also be updated to show the block is modified in accelerator's remote node.

Similarly, if a memory block is updated in shared memory, all locations that have cached the block must also be updated or invalidated. An advantage of the present invention, however, is that only initial read operations, write operations and synchronization by the accelerators may need to be transmitted.

Read Operation

An initial read operation may be an operation transferring data requiring processing by an accelerator from a shared memory location at node 0 to node 1. This access may be performed coherently to ensure that the accelerator has the latest version of the data available in the system. The read operation may be performed by Dynamic Memory Access (DMA) across link 230 by a DMA controller in each accelerator. The DMA access to a shared memory location, such as memory 212, by accelerators in node 1 may indicate whether the data will be transferred to a non-coherent local store or a coherent cache or memory. If the data is transferred to a coherent unit, an entry will be made in nodal directory 213 indicating the location, address and status of the data. However, if the data is transferred to a local store, no entry is made in the nodal directory.

Generally, the data read from a remote shared memory location may be stored in a local store associated with an accelerator. Because the local stores are non coherent, the accelerator may perform operations and modify the data in the local stores. Accesses to the local stores may not be transmitted to other nodes, thereby reducing bandwidth consumption. Furthermore, because no entries are made in the nodal directory at node 0, CPU accesses to memory locations transferred to the local stores need not be transmitted to node 1.

However, some read operations may cause data to be transferred to a coherent unit rather than a local store. For example, atomic operations and page table entries that are used for hardware translation of virtual addresses may be cached. Operations by accelerators on the data in these caches may be coherent, requiring transmission of addresses to other nodes. Likewise, operations by CPUs or accelerators in other nodes on this same data may be coherent, requiring transmission of addresses from other nodes.

Figure 4:
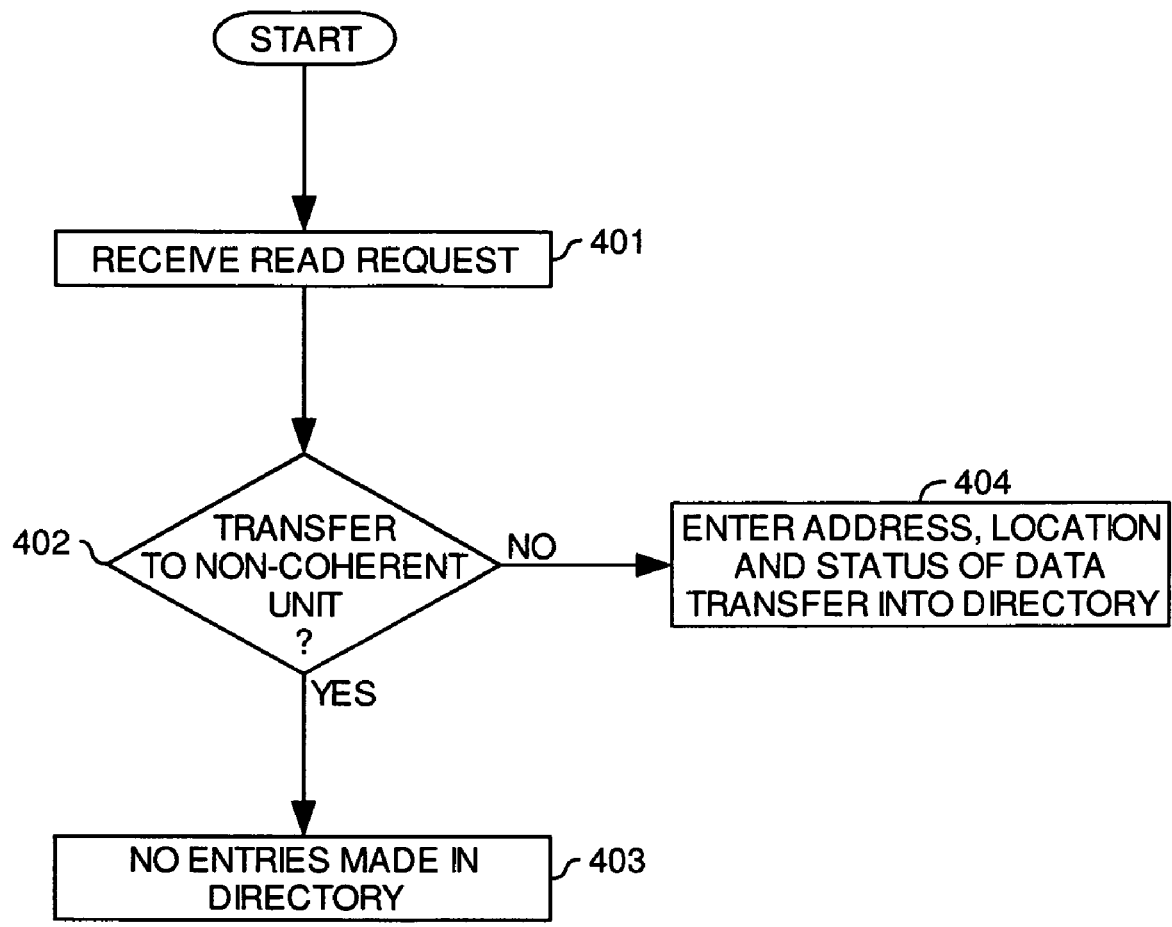
FIG. 4 is a flow diagram of exemplary operations performed to determine whether an entry must be made into a directory of a node containing shared memory.

FIG. 4 is a flow diagram of operations performed to determine whether an entry is made into a nodal directory at a node containing shared memory. The operations begin in step 401 by receiving a read request from a node containing accelerators. In step 402, if the read request indicates that the data read is being transferred to a local store, no entries are made into the nodal directory in step 403. On the other hand, if the read request indicates that the data is transferred to a coherent unit such as a cache or memory unit, in step 404 an entry may be made into the nodal directory indicating the address being transferred, the location of transfer and the status of the data.

Figure 3:
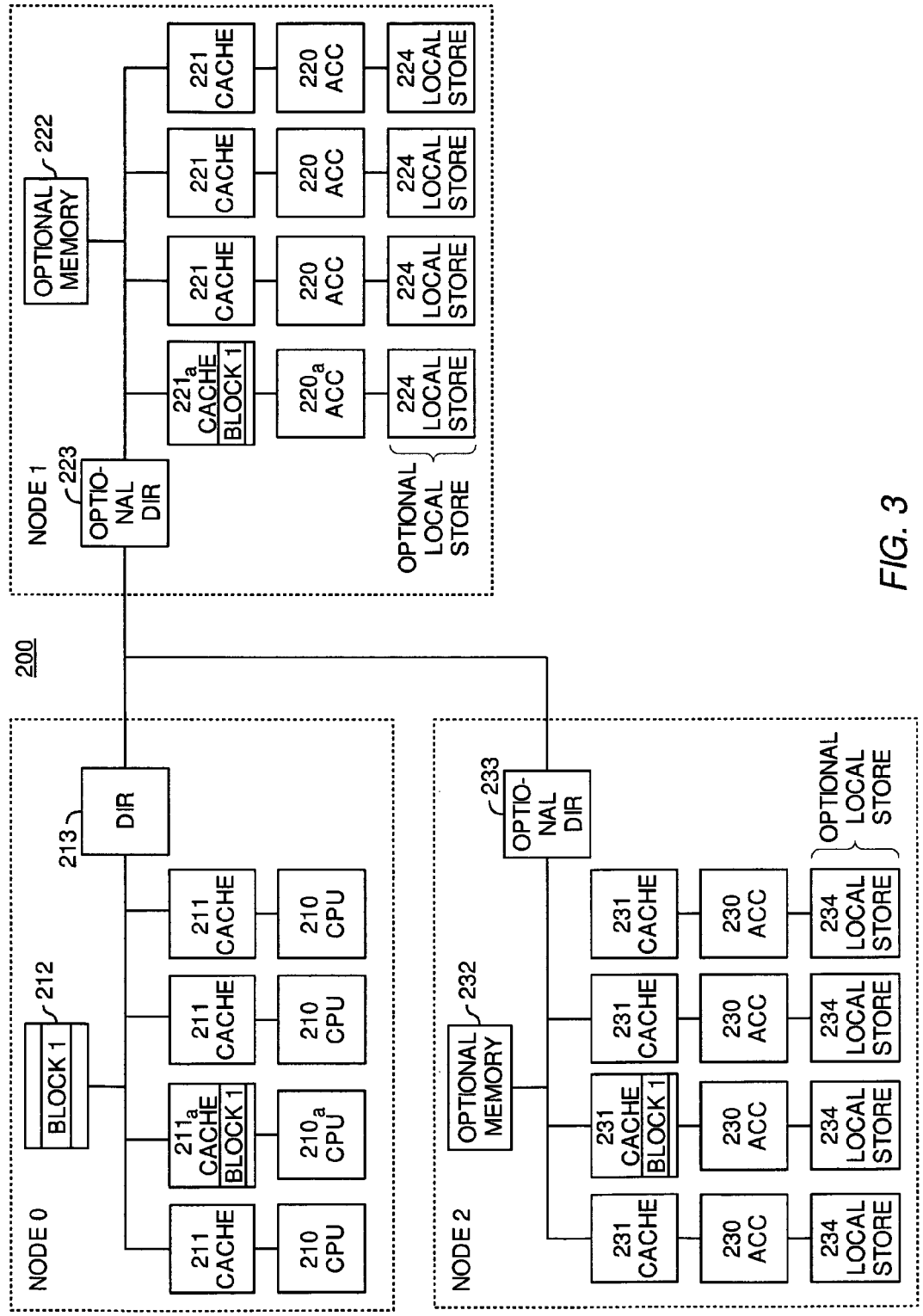
FIG. 3 is an illustration of a block of shared memory being accessed by CPUs in one node and accelerators in other nodes.

FIG. 3 illustrates a block of memory (block 1) of shared memory 212 being coherently accessed by the CPUs 210 in node 0 and accelerators 220 in node 1. For example, Block 1 may be cached in cache memory 211a for processing by CPU 210a in node 0. Subsequently, a task involving Block 1 may be delegated to accelerator 220a in node 1 requiring a copy of block 1 to be sent to node 1. Because Block 1 may have been modified by CPU 210a, cache 211a must be checked for an updated copy of block 1 prior to sending the block to node 1. Nodal directory 213 is also checked to determine if Block 1 is cached and modified in some other node. In some embodiments, the nodal directory is checked simultaneously with the snoop of caches 211a. If nodal directory 213 indicates that Block 1 is cached and modified in node 2, the address of Block 1 is sent to node 2. The destination node number 0 for the block is also sent to node 2. The caches in node 2 snoop the address and find Block 1 in cache 231. Block 1 may then be transferred to node 0. One skilled in the art will also recognize that a destination node number for node 1 may be provided to node 2 by node 0. Therefore, the modified block in node 2 may be directly transferred to node 1.

Figure 5:
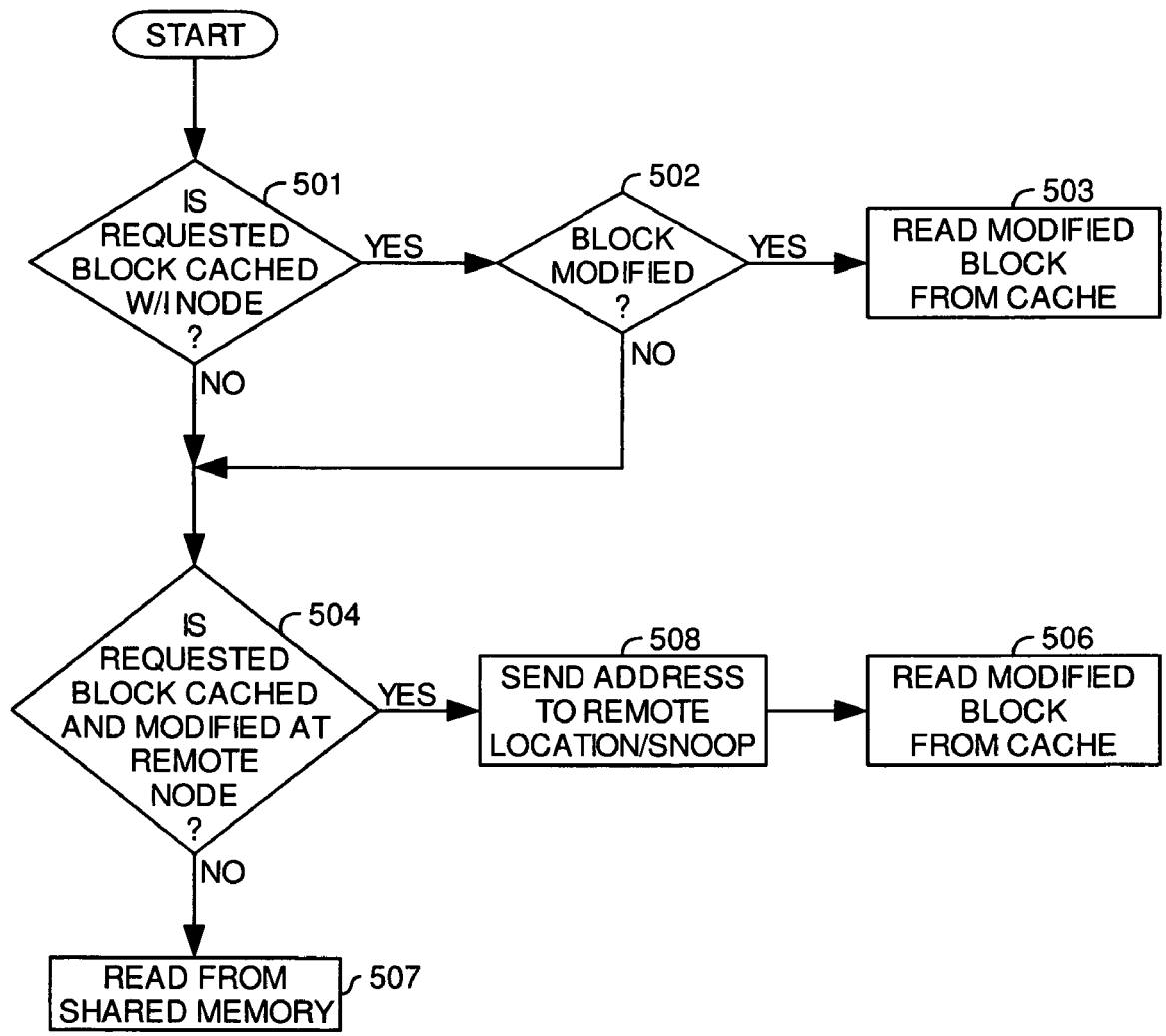
FIG. 5 is a flow diagram of exemplary operations performed to provide an accelerator the most recently modified copy of a memory block that is requested.

FIG. 5 is a flow diagram of exemplary operations performed to ensure that the most recent copy of a memory block is provided during a read operation by accelerators on shared memory (such as memory 212) at a first remote node. The operations begin in step 501 by determining whether the requested block of memory is cached within the first remote node. If the block is cached within the first remote node, then in step 502 the block is checked for modifications made to the data. If the block has been modified, the block is read directly from the cache containing the modified block.

If the requested block has not been cached in the first remote node or if the block was cached but not modified, in step 504, it is determined whether the block has been cached at a second remote node and if the block is modified. This may be accomplished, for example, by examining the nodal directory which may indicate the locations where the block may be cached and modified. If the block is cached and modified at a second remote node, the address of the block may be sent to the second remote node and snooped in step 508. The modified block may be read from the cache containing the modified block in the second remote node in step 506.

If the memory block is not cached at a second remote node or if the cached block at the second remote node has not been modified, the block may be read from the shared memory device at the first remote node, in step 507. One skilled in the art will also recognize that if the block of memory is cached in both: the cache in the first remote node and a cache in a second remote node, the most recently modified block may be read.

In contrast to the accelerators, most read operations by a CPU would be to locations that are not cached in a remote node and would be to memory in the CPU's node. In such cases the address for the block to be read need not be transmitted to the remote node. Furthermore, even if the block is cached in the remote node but is not modified, the address need not be transmitted. In all these cases, the nodal directory in the CPU's node can be used to determine the state of the block in other nodes. Thus the nodal directory may be used to avoid the transmission of most addresses to other nodes.

When a CPU performs a read at a location in shared memory in its own node, the address is snooped by other caches in the node. If any such cache contains the modified block, the block is read directly from the cache containing the modified block. If the requested block has not been cached in the node or if the block is cached but not modified, the nodal directory is checked. If the block is cached in a remote node and is modified, the address is transmitted to the remote node and snooped there. The modified data is then read from the cache containing the modified block in the remote node. In some embodiments, the remote cache and the nodal directory status are changed to indicate the cache line is not modified. The modified data may also be written to memory. With alternative cache protocols familiar to those skilled in the art, the memory write might be avoided and other cache states may be possible.

Write Operation

A write operation may be an operation transferring data from an accelerator in node 1 back to shared memory in node 0 after processing by an accelerator. As with the read operations, the write operation may also be performed by DMA access to shared memory at a remote node. Because outdated copies of this data may be in use in other caches in the system, this operation may also be performed coherently to update the caches containing outdated data.

Referring back to FIG. 3, block 1 may have first been cached in cache 221a for processing by accelerator 220a in node 1. It may then be cached in cache 211a for processing by CPU 210a or in cache 231 for processing by accelerator 230 in node 2. Block 1 may be modified by accelerator 220a and written back to shared memory 212 before CPU 210a processes the block. In some embodiments, block 1 may be invalidated in cache 211a and cache 231 when accelerator 220a writes to block 1. Invalidation may be done to prevent CPU 210a from accessing old data. In other embodiments, block 1 may be updated in cache 211a and cache 231 with the most recent data when accelerator 220a writes to block 1. Either way, CPU 210a and accelerator 230 are prevented from accessing old data after accelerator 220a writes to block 1. Therefore, the write operations by an accelerator may be performed coherently.

Figure 6:
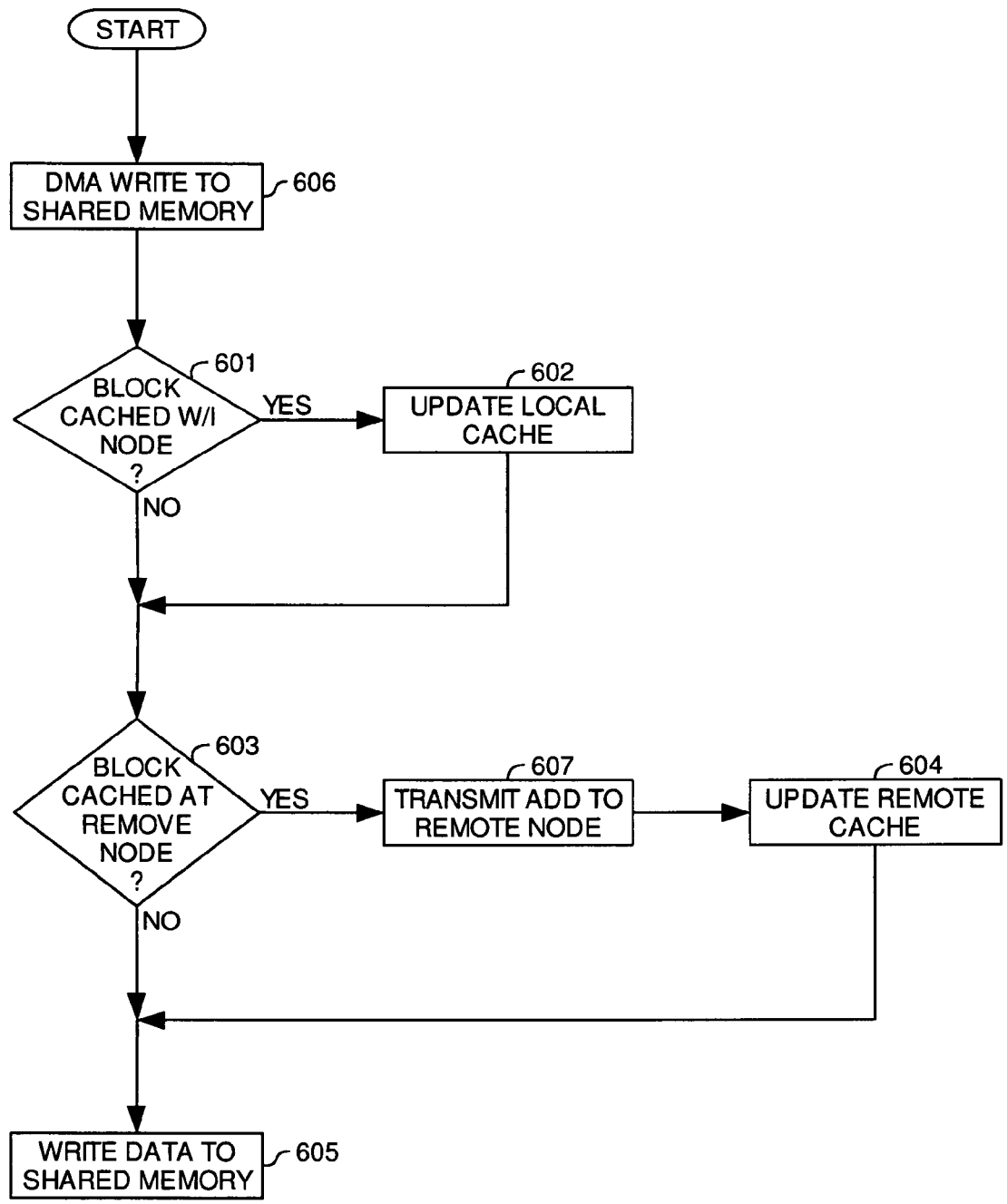
FIG. 6 is a flow diagram of exemplary operations performed to update all cached copies of a memory block being written by an accelerator back to shared memory.

FIG. 6 illustrates exemplary operations that may be performed to ensure that all caches are updated after an accelerator has finished processing data. The operations begin in step 606 with an accelerator performing a DMA write operation to a shared memory (such as memory 212) location at a first remote node. In step 601, the caches in the first remote node may snoop the address of the write operation and determine whether the address has been cached locally. If the address has been cached, the caches may update their respective copy of a memory block with the new write data in step 602. As noted earlier, in some embodiments, the caches may invalidate their respective copy of a memory block instead of updating their copy.

In step 603, it is determined whether the address of the write has been cached at a second remote node. This may be accomplished by examining the nodal directory to find locations in other nodes where an addressed memory block may have been cached. If the memory block has been cached at a second remote node, the address may be transmitted to the second remote node in step 607. The address may be snooped by the caches at the second remote node and caches containing the addressed memory block may be updated with the new write data in step 604. In other embodiments, the address block may be invalidated in the cache(s) at the second remote node. In step 605, the data may be written to the shared memory in the first remote node.

Write operations by a CPU may be primarily to locations in shared memory in the CPU's node. In such cases the address for the block to be written need not be transmitted to the remote node. The nodal directory in the CPU's node can be used to determine the state of the block in other nodes. Thus the nodal directory can be used to avoid the transmission of most addresses to other nodes.

When a CPU does a write of a location in the memory in its own node, there may be several cases to consider. In one case, the addressed block may already be in the cache attached to the CPU and the block may already be modified. In this case the cache may simply be updated with the new data.

In a second case, the addressed block may already be in the cache attached to the CPU but the block may not be modified. In this case the address may be snooped by other caches in the node. If any such cache contains the modified block, the block may be invalidated. The nodal directory may also be checked. If the block is cached in a remote node, the address may be transmitted to the remote node and snooped there. The block may be invalidated in the remote cache. The CPU's cache may then be updated with the write data.

In a third case, the addressed block may not be in the cache attached to the CPU. In this case the address may be snooped by other caches in the node. If any such cache contains the block and it is modified, the data may be read from this cache. The nodal directory may also be checked. If the block is cached in a remote node, the address may be transmitted to the remote node and snooped there. If any remote cache contains the block and it is modified, the data may be read from that cache. If no cache has a modified copy of the block, the block may be read from memory. The block may be invalidated in all caches except the CPU's cache. The CPU's cache may then be updated with the write data.

By performing non coherent accesses on data that was first accessed coherently, transmission of addresses and commands to other nodes in a system may be eliminated for the non coherent accesses. After the processing of the data is complete, the accelerators may write back data coherently. Therefore, data consistency can be maintained while reducing the consumption of bandwidth for maintaining memory coherence across the nodes of a multiprocessing system.

While the foregoing is directed to embodiments of the present invention, other and further embodiments of the invention may be devised without departing from the basic scope thereof, and the scope thereof is determined by the claims that follow.

What is claimed is:

1. A method for maintaining memory coherence between nodes, the method comprising:
   providing at least one first node wherein the first node comprises:
      one or more central processing units (CPUs);
      cache memory associated with each of the one or more CPUs;
      shared memory; and
      a nodal directory identifying locations that reside in shared memory in the first node that are cached at other nodes;
   providing at least one second node wherein the second node comprises:
      one or more accelerators;
      cache memory associated with each of the one or more accelerators; and
      a local store associated with each of the one or more accelerators;
   coherently transferring a block of the shared memory from the first node to one of the local store or cache memory of an accelerator in the second node;
   non coherently performing one or more operations on the transferred block in the local store; and
   coherently writing back the block of memory to the shared memory device after performing the one or more operations.

2. The method of claim 1, wherein coherently transferring the block of shared memory in the first node to the second node comprises:
   determining whether to transfer the memory block to the cache memory in the second node or the local store in the second node; and
   if it is determined that the memory block is to be transferred to the cache memory, entering the address of the memory block and the location of the cache memory in the nodal directory in the first node.

3. The method of claim 2, comprising determining whether to transfer the memory block to the cache memory in the second node or the local store in the second node based on a signal from the second node indicating the location of the transfer.

4. The method of claim 1, wherein coherently transferring one or more blocks of shared memory in the first node to one or more local stores in the second node comprises:
   sending to the first node, by the second node, an address of the memory block desired from the shared memory;
   snooping of the address by the one or more cache memories in the first node to determine whether the memory block is cached within the first node;

examining the nodal directory to find locations outside the first node where the memory block may be cached;
if the memory block is cached at a location outside the first node, sending the address of the block to the location outside the first node;
determining whether the memory block is modified at the cached locations; and
if the memory block has been modified, retrieving the most recently modified block.

5. The method of claim 1, wherein coherently writing back the block of memory to the shared memory device after performing the one or more operations comprises:
sending to the first node, by the second node, an address of the memory block to be written to the shared memory;
snooping of the address by the one or more cache memories in the first node to determine whether the memory block is cached within the first node;
examining the nodal directory to determine whether the memory block is cached at a location outside the first node;
if the memory block is cached at a location outside the first node, sending the address of the block to the location outside the first node;
writing the block to the cached locations to update the cache; and
writing the block to the shared memory in the first node.

6. A method for maintaining memory coherence between nodes, the method comprising:
providing at least one first node wherein the first node comprises:
one or more central processing units (CPUs);
cache memory associated with each of the one or more CPUs;
shared memory; and
a nodal directory identifying blocks of the shared memory that are cached at other nodes and the locations of the other nodes;
providing at least one second node wherein the second node comprises:
one or more accelerators;
cache memory associated with each of the one or more accelerators; and
a local store associated with each of the one or more accelerators;
receiving a request to access a block of shared memory by one of the one or more central processing units;
in response to receiving the request, accessing the nodal directory to determine whether the block is cached at the second node, whether the block is modified, and a location of the second node; and
transmitting the address of the block to the second node if the block is cached and modified at the second node.

7. The method of claim 6, further comprising:
snooping of the address of the block by the cache memory associated with the one or more CPUs to determine whether the block is cached within the first node.

8. The method of claim 6, further comprising retrieving the modified block from the cache containing the modified block.

9. The method of claim 6, further comprising invalidating the block in the one or more caches containing the block if the request was a write operation.

10. A system comprising:
at least one first node comprising:
one or more central processing units (CPUs);
cache memory associated with each of the one or more CPUs;
shared memory; and
a nodal directory identifying blocks of the shared memory that are cached at other nodes and the locations of the other nodes; and
at least one second node comprising:
one or more accelerators;
cache memory associated with each of the one or more accelerators; and
a local store associated with each of the one or more accelerators,
wherein:
the first node is configured to:
receive a request to access a block of shared memory; and
in response to receiving the request, determine whether the block is cached within the first node or another node and whether the block is modified;
if the access is a read access, provide the most recently modified block of shared memory; and
if the access is a write access, update or invalidate locations where the memory block is cached; and
the second node is configured to:
coherently issue a request to access the block of shared memory in the first node; and
if the block is transferred to the local store, non-coherently perform operations on the block.

11. The system of claim 10, wherein to access the block of the shared memory the second node is further configured to generate a signal indicating whether the block will be transferred to the cache memory or the local store and the first node is further configured to transfer the block based on the signal.

12. The system of claim 11, wherein if the block is transferred to the cache memory in the second node, the first node is further configured to enter, in the nodal directory, the address of the block and the location of the cache memory.

13. The system of claim 10, wherein to provide the most recently modified copy of the memory block, the first node is configured to:
determine whether a modified copy of the block is cached in the first node;
determine whether a modified copy of the memory block is cached at any other node in the system; and
if a modified copy exists, transfer the most recently modified copy of the block to the second node.

14. The system of claim 13, wherein to determine whether a modified copy of the block is cached in the first node the caches in the first node are configured to:
snoop an address of the block associated with the request to determine whether the block is cached in the first node; and
if the block is cached, determine whether the block has been modified.

15. The system of claim 13, wherein to determine whether a modified copy of the block is cached at any other node in the system the first node is configured to:
examine the nodal directory to determine whether the block is cached at any other node;
if the block is cached at any other node, retrieve the block from the other node if the block is modified by the other node.

16. The system of claim 10, wherein to invalidate or update the memory block in response to the write access, the first node is configured to:
determine whether the block is cached in the first node; and
determine whether the block is cached at any other node in the system.

17. The system of claim 16, wherein to determine whether the block is cached in the first node the caches in the first node are configured to snoop the write access.

18. The system of claim 16, wherein to determine whether the block is cached at any other node in the system the first node is configured to examine the nodal directory.

19. The system of claim 10, wherein the first node is further configured to:
   in response to determining that the block is cached and modified at a third node, transmit the address of the block and a number associated with the second node to the third node; and
   the third node is configured to transmit the block to the second node.

20. The system of claim 19, wherein the first node is configured to examine the nodal directory to determine whether the block is cached at the third node and if the block is modified.

* * * * *